United States Patent [19]

Engelke et al.

[11] Patent Number: 5,432,837
[45] Date of Patent: Jul. 11, 1995

US005432837A

[54] TELECOMMUNICATION DEVICE FOR THE DEAF WITH AUTOMATIC TRANSMISSION CAPABILITY

[75] Inventors: Robert M. Engelke, Madison; Kevin Colwell, Middleton; Ronald W. Schultz, Madison; Jeffrey Hilliard, Verona; Troy Vitek, Madison, all of Wis.

[73] Assignee: Ultratec, Inc., Madison, Wis.

[21] Appl. No.: 129,894

[22] Filed: Sep. 30, 1993

Related U.S. Application Data

[63] Continuation-in-part of Ser. No. 886,552, May 20, 1992, abandoned, and a continuation-in-part of Ser. No. 886,553, May 20, 1992, Pat. No. 5,325,417.

[51] Int. Cl.⁶ .......................................... H04M 11/00
[52] U.S. Cl. ........................................ 379/52; 379/98
[58] Field of Search ................................ 379/52–54, 379/90, 93, 96–99, 110, 108; 340/825.19; 370/31, 24, 110.1; 375/8, 9, 91, 107, 114, 116, 121

[56] References Cited

U.S. PATENT DOCUMENTS

| | | | |
|---|---|---|---|
| 3,507,997 | 4/1970 | Weitbrecht | 379/108 |
| 3,896,267 | 7/1975 | Sachs et al. | 379/52 |
| 4,451,701 | 5/1984 | Bendig | 379/96 |
| 4,959,847 | 9/1990 | Engelke et al. | 379/98 |
| 5,081,673 | 1/1992 | Engelke et al. | 379/52 |
| 5,091,906 | 2/1992 | Reed et al. | 370/31 |
| 5,121,421 | 6/1992 | Alheim | 379/52 |
| 5,163,081 | 11/1992 | Wycherley et al. | 379/52 |

FOREIGN PATENT DOCUMENTS

| | | | |
|---|---|---|---|
| 2749923 | 5/1979 | Germany | 379/52 |
| 60-259058 | 12/1985 | Japan | 379/96 |

*Primary Examiner*—Wing F. Chan
*Attorney, Agent, or Firm*—Quarles & Brady

[57] ABSTRACT

A telecommunication device for the deaf is designed to operate under an enhanced TDD communication protocol. The TDD is capable of communicating with conventional TDDs operating under normal Baudot-/Weitbrecht communications, but is also capable of communicating with a similarly enhanced TDD utilizing an enhanced protocol with a faster data transfer rate. The enhanced TDD is capable of signaling to another remote TDD through the use of a synchronization character that it is capable of enhanced TDD communications. If a similar synchronization character is received from the remote station, both TDDs can then switch to enhanced TDD communication with its advantages of speed and enlarged character set. The enhanced protocol permits increased functionality of the TTD terminals in providing machine-to-machine communication in a manner invisible to the TTD user. A machine-to-machine control character similar to the synchronizing character is used to designate such messages.

15 Claims, 3 Drawing Sheets

TELECOMMUNICATION DEVICE FOR THE DEAF WITH AUTOMATIC TRANSMISSION CAPABILITY

This application is a continuation-in-part of U.S. application Ser. No. 07/886,552 entitled: TELECOMMUNICATION DEVICE OPERATING UNDER AN ENHANCED TDD PROTOCOL filed May 20, 1992, now abandoned, and a continuation-in-part of U.S. application Ser. No. 07/886,553 entitled: TELECOMMUNICATION DEVICE FOR THE DEAF WITH AUTOMATIC SELF-IDENTIFICATION filed May 20, 1992 now U.S. Pat. No. 5,325,417.

FIELD OF THE INVENTION

The present invention relates to the general field of telecommunication devices for the deaf (TDDs), and in particular, relates to a telecommunication device automatically transmitting character strings for controlling equipment or communicating essential data.

BACKGROUND OF THE INVENTION

People who are deaf or hearing impaired may make use of communication terminals specifically constructed and designed to enable such persons to converse over the telephone lines. Such devices are referred to as telecommunication devices for the deaf or TDDs (or TTYs). Typically, the TDDs include a keyboard and a display connected to the telephone through a modem (modulator/demodulator). The modem is built into the TDD and either directly connected to a telephone line or coupled by an acoustic coupler to a normal telephone handset. TDDs are normally capable of transmitting information over telephone lines by means of coded tones to other TDDs connected at opposite ends of the telephone line through another modem.

The code and protocol which is in widespread conventional use for TDD communication is an idiosyncratic one. The code set, known as Baudot, and the communication protocol, referred to here as Baudot/Weitbrecht, evolved historically at a time when many telecommunication devices for the deaf were based on mechanical or electromechanical devices rather than electronic devices. Accordingly, the protocol was constructed for a set of constraints which no longer are relevant to present day devices. As it happens, those constraints work to create a code protocol and a telecommunication network of users and devices operating under that protocol, which is now perceived to have certain deficiencies.

One deficiency with the Baudot/Weitbrecht protocol is simply speed. Conventional Baudot/Weitbrecht communication is conducted at 45.5 Baud (or in some countries 50 Baud). The normal Baudot character set consists of five bit characters. Under conventional Baudot/Weitbrecht communication, there is a start bit (one space or zero bit), a five bit character, and at least one and ½ stop bits (a mark or a one bit). The result is that operating under the protocol, it is possible to transmit only six characters per second. As it happens, many adept typists among TDD communicators are ready able to type at rates significantly in excess of six characters per second. While modern microprocessor-based TDDs are capable of buffering such adept typists, the result is that the transfer of communications from one TDD terminal to another can, at times, be significantly delayed behind a fast typist. This has been a source of frustrations to users in the TDD community for some time.

Another deficiency with conventional TDDs operating under Baudot/Weitbrecht protocols has to do with the fact that communication is defined to be simplex, meaning that only one terminal is capable of communicating at one time. Since both transmitting and receiving stations use the same frequencies for designating marks and spaces on the telephone (14,000 Hertz for a mark and 18,000 Hertz for a space) both stations cannot send data at the same time without interference. There is no provision for avoiding such interference in the conventional Baudot/Weitbrecht protocol. Instead, prior machines are designed to give priority to data transmission. The devices will transmit a character if the key is pressed, and while the device is sending, no attempt is made to receive data.

As a result of this simplex operation of present Baudot machines, in order to approximate the given take of normal conversation, TDD users generally have to indicate to the other user when that user that has the "floor" is ending that particular communication. For example, it is quite common convention in the United States to type the letters "GA" as an abbreviation for "go ahead" at the end of a text string to indicate to the other user that it is his or her turn to type. A user who wishes to interrupt a transmission is not successful in communicating to the other device, which is not monitoring for messages during its transmission, and typically garbles the data being received at that time.

Yet another deficiency with the Baudot/Weitbrecht protocol is in the limited number in bits employed to represent characters. With 26 letters and 10 numerals, generally, full representation of an alphanumeric set requires six bits or 64 possible code words, enough to cover the letters (in either upper or lower case, but not both) the numbers and 28 punctuation symbols and control signals. The Baudot code only provides 32 code words primarily used for upper case alphabetic characters which may be extended by a mode change character to provide numeric symbols and some punctuation symbols. Failure of one TDD to properly interpret this mode change character may result in a garbling where subsequent characters are misinterpreted as numbers rather than letters or vice versa.

This shortage of possible code words also requires that specialty commands communicating between one TDD and another must be constructed of a series of character strings that may be inherently recognized as not being text to be read by the user. There is presently no established protocol to designate such nontext data.

These deficiencies while primarily an inconvenience to the user, also prevent useful increased functionality of TDD devices. One such improved function would be the automatic and rapid transmission of large blocks of text data that have been preprogrammed by the user, the transmission being invisible to the user. Such transmission might be useful for communicating user identification information to an emergency service. In the present Baudot/Weitbrecht protocol, such large blocks of data would take considerable time to transmit and because of the lack of duplex capability carry the risk of being interrupted by the TDD operator who remains unconscious of the automatic transmission. Also, because of the slow rate of Baudot communication, large blocks take comparably large amounts of time to transmit and therefore cannot be transmitted invisibly to the user, who at a minimum must wait for the transmission for a period of time that may approach the amount of time it would take to type material himself or herself.

The low speed of Baudot and the lack of extra codes which can be designated with particular functions seriously curtails the implementation of automatic machine-to-machine communication over the phone lines. The required multiple strings of characters necessary to differentiate such nontext messages for text messages are unwieldy, interrupt user communication and are subject to being garbled by the conversation of the TDD users ordinarily occurring at the same time.

These limitations might be readily overcome by redefining the communication protocol of TDD devices, for example, by using a higher speed protocol with a greater number of bits such as in the commonly used information protocol of the electronics industry, referred to as ASCII (American Standard Code for Information Interchange). The ASCII code provides eight bits of code words or 256 different code words and is considerably faster than the Baudot standard starting at 300 as opposed to 45 Baud. However, such a redefining is not practical because of the large installed base of TDDs in use in many parts of the world including the United States. A new protocol if implemented and if not compatible with this installed base would be of limited value if it could not communicate with normal Baudot terminals. The value of the TDD system is in the existence of many compatible terminals.

SUMMARY OF THE INVENTION

The present invention provides an enhanced protocol particularly suited for automatic communication of blocks of text and machine-to-machine commands without the intervention or interruption of the user. In particular, at the commencement of operation, the initiating terminal transmits a synchronizing sequence invisible under conventional Baudot protocols but detectable by other terminals having this enhanced capability in order to switch both machines into an enhanced TDD protocol. The enhanced protocol permits faster data communication, provides a pseudo duplex capability and an expanded character code set of seven bits.

It is an object of the present invention to provide an enhanced protocol that permits the effective transmission of text blocks and machine-to-machine instructions and yet that permits normal communication with standard Baudot devices.

It is another object of the invention to permit an increase in the functionality of the TDD devices without increasing their complexity to the user by providing certain automatic features that operate invisibly to the user.

It is a further object of the invention to permit the rapid communication of important predefined text blocks between TDD terminals with reduced risk of interference from other transmissions and without noticeably interrupting the use of the TDD terminal for real time communication.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT HARDWARE

Figure 1:
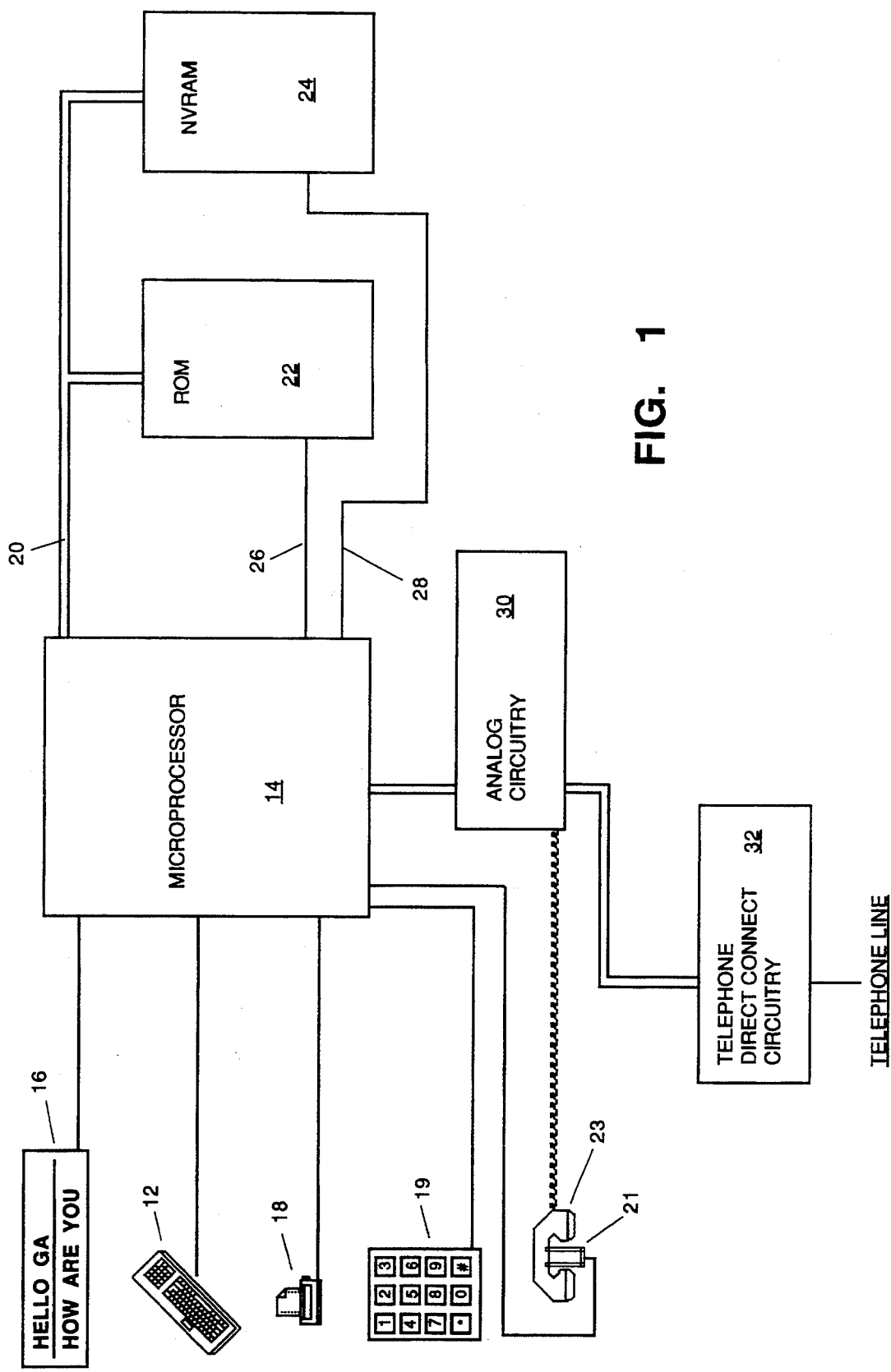
FIG. 1 is a schematic diagram of a TDD hardware design.

In order to understand the functioning of the present invention, it is necessary to review the structure of a typical TDD. Shown in FIG. 1 is a schematic block diagram of the circuitry of a typical TDD, either a standard or enhanced TDD operating in accordance with the present invention. In the TDD of FIG. 1, a keyboard 12 is provided onto which the user may input data characters. The output of the keyboard 12 is connected to a microprocessor 14, which serves to control the remaining circuit elements contained within FIG. 1. Characters which are received, or transmitted, by the microprocessor are also displayed to the user on a visual display 16. Optionally, the same characters received or transmitted can be printed by a hard copy printer, indicated at 18. Some TDDs may not have a printer, though all will have a visually readable display of some kind, so that the user can see the characters being typed and received. The keyboard 12 thus functions as an input source of data characters to the microprocessor 14 while either or both of the display 16 and the printer 18 serve as local destinations for the data stream of characters.

The microprocessor 14 is connected by a suitable data and address bus 20, of the sort well known to those of ordinary skill in the art, which connects to a read only memory (ROM) 22 and a non-volatile random access memory (NVRAM) 24. Appropriate control lines 26 and 28 are connected from the microprocessor 14 to the ROM 22 and the NVRAM 24, so as to control the operation thereof. The ROM 22 is intended to permanently house, in non-volatile storage the program which dictates the operation of the microprocessor 14 as well as certain data used by that program such as specialized character strings for machine-to-machine communication and for synchronizing two TDDs in an enhanced operating mode to be described. The NVRAM 24 is utilized as the buffer, a floating storage place for data coming into or out of the device, and for the storage of standard text messages as entered by the user through the keyboard 12 and intended to rapid transmission as a block of text. Rather than being on separate integrated circuits, if desired the microprocessor 14 and the ROM 22 and NVRAM 24 may all be combined in a single integrated circuit.

Also connected to microprocessor 14 is a telephone keypad 19 which permits the entry of telephone numbers for dialing by the microprocessor 14 through dialing circuitry 32 to be described. A standard telephone handset 23 rests on cradle 21 which incorporates a switch (not shown) indicating whether the handset 23 is in use and thus removed from the cradle 32.

The microprocessor 14 is connected through analog circuitry 30 to a direct connect circuit 32, which is intended to directly connect by hardwiring the analog circuit 30 to a telephone line. The analog circuitry 30 provides a connection between the handset 23 and the telephone direct connect circuitry 32 and the computer 14 and can produce not only the necessary Baudot tones but the dialing tone pairs used to dial numbers. The analog circuitry 30 also provides an interface of audio voice information to and from the handset 23.

Figure 2:
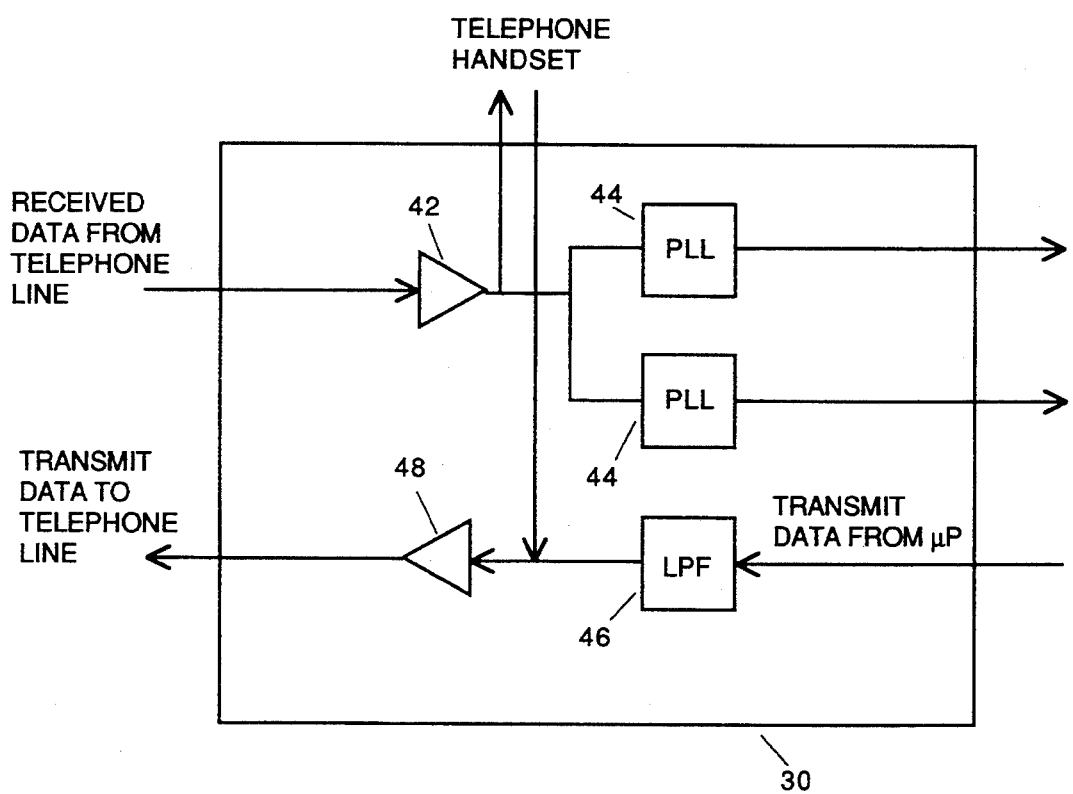
FIG. 2 illustrates schematic details of the analog circuit of FIG. 1.

Shown in FIG. 2 is a simplified schematic of one implementation of the input and output of the analog circuitry. For data coming into the terminal, the audible input from the telephone line is translated into electronic components and then presented to an amplifier 42. The output of the amplifier is presented to two phase-locked loops 44. One of the phase-locked loops 44 is tuned to a frequency of 1800 Hertz, while the other phase-locked loop 44 is tuned to a frequency of 1400 Hertz. 1800 Hertz and 1400 Hertz are the designated carrier frequencies for standard Baudot communication. On the output side of the circuitry, output signals, being "square waves" from the computer 14 are presented to a LPF (low pass filter) which acts as a wave shaping circuit 46. The output of that circuit, consisting of alternate 1400 and 1800 Hertz signals, is presented to an amplifier 48 which is hardwired to the telephone line.

In essence, devices designed generally similar to FIG. 1 are sold by several companies at present. The improvements described below will be principally to the method of operation of such a terminal, as controlled by the code which operates the microprocessor 14. In other words, the enhanced TDD terminal will have hardware largely similar to that of a conventional Baudot TDD, but will operate in a different manner both in its timing and code utilization.

Enhanced Baudot Protocol

Figure 6:
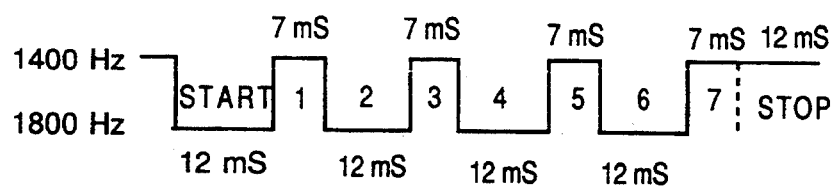
FIG. 6 illustrates a timing diagram of a character in an enhanced communication protocol.

The enhanced TDD device operating in accordance with the present invention is capable of operating at normal 45.5 Baud (or 50 Baud) when communicating with a conventional TDD. However, the enhanced TDD protocol TDD is also capable of operating in a second protocol, referred to here as enhanced TDD. Referring to FIG. 6, the enhanced TDD protocol is based on frequency shift encoding and an average, though variable, transmission rate of just over 100 Baud. The signals for logical 1 and logical 0 are just as they are in standard Baudot, i.e. 1400 hertz for a mark and 1800 hertz for a space. However, this protocol is unusual in that, for reasons described below, the time for a space bit and the time for a mark bit are defined to be different (12 milliseconds versus 6 milliseconds). Moreover, the enhanced TDD character set consists of a 7-bit 128-character table such as the ASCII or CCITT character tables. The enhanced TDD character data signal consists of a start bit, the 7 character bits, no parity bit, and two stop bits. The start bit is a space, and the stop bits are marks.

Many current TDDs utilize phase-locked loops to monitor incoming TDD tones. Since existing devices were designed to operate at 45.5 Baud, the phase-locked loops were selected for that transmission rate. One widely used design includes phase-locked loops, such as indicated at 44 in FIG. 2, which may require as long as 4 to 7 milliseconds to "lock" on an incoming frequency. At a flat 100 Baud, this may leave as little as 3 milliseconds of recognizable signal (10 milliseconds minus 7 milliseconds). To add to the reliability for enhanced TDD protocol machines, this protocol defines the bit time of one polarity (space) to be longer than the other (mark), i.e. 12 milliseconds compared to 6 milliseconds, to be sure that the receiving station can reliably detect at least one bit polarity. The receiving station need not actually detect the bits of the other polarity (mark), but can calculate the time period of the mark bits by noting the absence of the space bit tone and dividing the elapsed time period by the assigned bit time for mark bits msecs) to determine the number of successive marks which were sent.

Such single channel decoding is sometimes considered undesirable due to the possibility of detecting noise bursts in the decoded channel as characters. This can be avoided by requiring two mark stop bits, which then form a signal long enough to be recognized by the 1400 Hz phase-locked loop. Lack of a properly defined stop bit indicates noise. The use of two stop bits ensures that the 1400 Hz signal is maintained long enough (12 milliseconds) for the 1400 Hz phase-locked loop to actuate.

The use of such differential bit times achieves the compromise of achieving an overall average data transfer rate exceeding 100 Baud while adapting to the limitations of existing hardware. It is an interesting side effect in that the length of time to transmit the various ASCII characters will vary. The longest character, the "null" character of 7 spaces would require 108 milliseconds (1 12 msec start; 7×12 msec character; 2×6 msec stop), while the shortest would be 66 milliseconds. The average character would be 87 milliseconds. This then turns out to be, on average, a faster effective data transfer rate than simple 100 Baud.

Automatic Identification of Enhanced Terminals

Enhanced TDD, like conventional Baudot, operates in a simplex mode, although the details of operation of the simplex communication protocol, as described below, result in a pseudo-duplex capability as perceived by the users. Further, the enhanced TTD uses the same frequency encoding 1400 and 1800 Hertz tone generation and tone recognition circuitry already present in most TDDs. Thus the enhanced protocol permits a degree of compatibility with current Baudot devices. Nevertheless the 7-bit character set, a uniquely defined Baud rate with unequal bit times, requires both terminals to be operating in enhanced mode. This is ensured by a unique handshake routine. The handshake allows the protocol implementation to be automatic and not to require settings or other intervention by the user.

In essence, the enhanced TDD device operates to initially query the device on the other end to determine whether the remote TDD is also capable of enhanced TDD protocol communications. The enhanced TDD device presents this inquiry by sending a special synchronization sequence to the other TDD termed an "O-SYNCH" sequence. The O-SYNCH sequence is intended to be incomprehensible, or undetectable, by a conventional Baudot TDD.

If an enhanced TDD device sends the O-SYNCH sequence, and receives the correct response, preferably an "A-SYNCH" sequence sent in return, then both machines can immediately commence communication in enhanced TDD protocol. If the enhanced TDD terminal fails to receive the proper synchronization sequence from the remote unit, it assumes that the remote unit is operating in conventional Baudot, and continues to communicate using conventional Baudot protocols.

It is also desirable that, if there is a pause in the communication, that the TDDs operating under the protocol re-synchronize. This may be done by a new synchronization handshake. Thus the synchronization sequence may be sent just at the beginning of the entire communication session, but it is preferred that the sequence be sent after each pause on the line or at predefined intervals.

The synchronization sequence of the O-SYNCH sequence and the A-SYNCH sequence for the enhanced TDD protocol must also be idiosyncratic. They should be sequences which will not be recognized as a display character by a conventional TDD, but which can easily be recognized by an enhanced TDD. This is done, in part, by defining the synchronization signals to include recognizable tone only for mark (1400 Hz) bits and to include no space bits (1800 Hz). Since conventional Baudot/Weitbrecht characters are defined to begin with a space bit, the absence of a space bit means that the enhanced TDD synchronization sequences will never be recognized by a conventional TDD. To minimize error, when a mark (1400 Hz) tone is not being sent, an echo suppression tone is applied. The echo suppression tone can be any convenient tone signal outside of the range of the phase-locked loops and within the bandwidth of the telephone line. An exemplary echo suppression tone frequency could be 100 Hz. This tone could, since it is not detected, vary from machine to machine.

Figure 3:
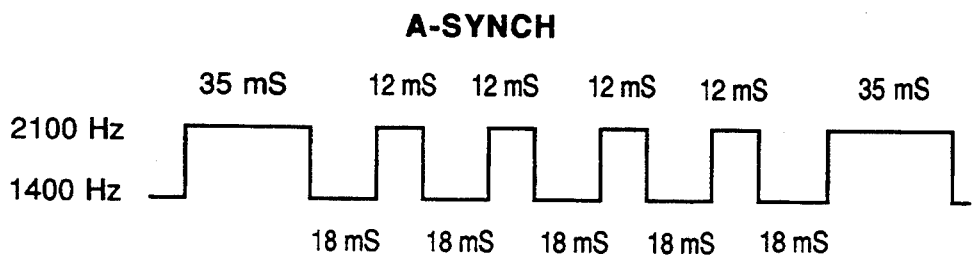
FIG. 3 illustrates a timing diagram of a first synchronization pulse utilized in the present invention.
Figure 4:
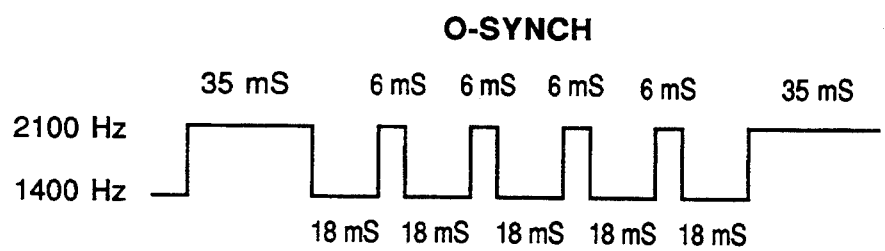
FIG. 4 illustrates a timing diagram of a second synchronization pulse utilized in the present invention.

Shown in FIGS. 3 and 4 are timing diagrams of the O-SYNCH sequence and the A-SYNCH sequence for enhanced TDD communication. In essence, the synchronization characters are special code signals specifically created for the purpose of serving as synchronization signals.

In order that the synchronization sequences not be received as a printed or displayed character by conventional Baudot TDDs, they have specific features to accomplish that objective. First, note that the synchronization signals are all ones (1400 Hz) and echo suppression tones, with no space (1800 Hz) tones at all. The bit times vary in length. The synchronization sequence begins with an echo suppression tone (EST) of neither 1400 nor 1800 Hz for 35 milliseconds, which is sufficient to suppress echoes or transients on the line and unlock both the 1400 and 1800 Hertz phase-locked loops. Then there are five 18 millisecond mark (1400 Hz) tones each followed by a 6 millisecond echo suppression tone for the O-SYNCH sequence or a 12 millisecond echo suppression tone for the A-SYNCH sequence. Thus the sequence includes a specific progression which can be recognized by the receiving station and which is very unlikely to be mistaken for a display character. The TDDs may distinguish between the O-SYNCH sequence and the A-SYNCH sequence simply by timing the separation between marks. The two character types provide additional assurance against the inadvertent switching of the TDDs into the enhanced protocol.

Under conventional Baudot protocol, a space bit is required to recognize a valid character by TDDs. Conventional Baudot protocol requires that there be a start bit, which is a logical 0, as the first bit time of a valid character transmission. Thus, conventional TDDs will reject the synchronization sequence as an invalid Baudot character simply on that basis. From this discussion, it should be apparent that the transmission of a single synchronization character by an enhanced TDD device will not result in any disruption or confusion if received by conventional prior art TDD.

The enhanced TDD terminal, which is capable of over 100 Baud operation, would be programmed to recognize the transmission of the O-SYNCH sequence. Upon receipt of the O-SYNCH sequence, the enhanced TDD would reply with the A-SYNCH sequence to establish that they are both capable of enhanced Baudot communications. The originating TDD would then preface the first character sent in the enhanced mode with yet another A-SYNCH sequence to confirm receipt of the first A-SYNCH response. This latter A-SYNCH sequence is "loosely" decoded by the receiving TDD which simply checks for any two pulse edges separated by 30 milliseconds, such as will characterize the A-SYNCH sequence but which does not require the perfect reception or complete transmission of the A-SYNCH signal.

After detection of the requisite two edges of the second A-SYNCH sequence, and both terminals then will conduct all subsequent communications in the enhanced TDD protocol. If this simple handshake is used, there should be at least about a 10 millisecond pause between the characters, or a pause sufficient to permit the telephone lines to settle to avoid erroneous result.

In order that the most rapid communication protocol available be utilized by communicating terminals, each enhanced TDD would be programmed to send the synchronization character at the start of any data communication in a new communication session and pause for a time period sufficient for the communicating station to respond. In other words, the first character which the TDD sends on the line is the synchronization character. Since the entire handshake can be accomplished, if only two synchronization characters are used, in less than 250 milliseconds, the process will be largely transparent to the users. Nevertheless, in that time period, the two machines would recognize that each is capable of enhanced TDD communication and further communication would be conducted using that protocol, with its accompanying advantages to the communicating persons. Other variations on the handshake are also possible. It may be necessary, on occasion, to have each station transmit two synchronization sequences to the other to verify enhanced TDD protocol capability prior to switching to enhanced TDD communication.

Regardless of which handshake protocol is utilized, the enhanced TDD terminal must be capable both of detecting the synchronization character when received or, alternatively, detecting a conventional 45.5 Baud character indicative of enhanced TDD protocol capability when received. If the enhanced TDD sends a synchronization pulse, or whatever other pattern is utilized to indicate the capability of enhanced TDD communication, and no appropriate return handshake is received, the enhanced TDD terminal must be capable of conducting further communication under conventional Baudot/Weitbrecht protocols. These capabilities are all made possible by proper software coding of the microprocessor 14 of the TDD in FIG. 1. In essence, the timing of the data inputs and outputs can be entirely under control of the software, and hence by reprogramming the microprocessor, it is possible to alter the timing sequence to result in these functions as described herein. Once the functionality of a device is described as is done herein, the coding of the microcode to operate the microprocessor is well within the skill of those of ordinary skill in the art of modern electronic design.

Pseudo Duplex Capability

In the operation of the TDD in accordance with the present invention, further constraints are implemented in the enhanced protocol TDD which are intended to permit pseudo-duplex communication. This is done by implementing the two simple rules of pseudo-duplex communication referred to above. The microprocessor is programmed to accept data from the keyboard asynchronously and, if data is being received over the telecommunication line, to not transmit the data immediately but to store the characters typed in the buffer of the NVRAM 24. Meanwhile, if data is being received, it is displayed on the visual display for reading by the user. Meanwhile, the user can continue to type characters, and characters will be received by the device and placed into NVRAM for transmission in turn to the remote station. Techniques for buffering such communication lines by buffering both input and output data are techniques well known to those of ordinary skill in the art.

Consider the first of the two rules for operating pseudo-duplex TDDs. Under that rule, each station must be constrained not to make any transmissions outward on its communication line while it is receiving data. During that time period, keyboard characters from the user are stored in the buffer. The terminal will wait until there is a pause on the communication line and then transmit characters from its buffer in turn.

The second rule of pseudo-duplex communication requires that each station pause after a certain N number of characters have been transmitted. The number of characters N is between 1 and 72, and preferably between 1 and 10. Let us assume, for the purposes of illustration, that the number of characters to be transmitted before a pause is 20. At the end of twenty characters, the local enhanced TDD device will pause. If the remote terminal at the other end of the communication line is also an enhanced TDD device, which has characters in its stack to be transmitted, it will be free during the pause to begin transmission of characters in return. The transmission of characters from the remote TDD will cause the local enhanced TDD to not transmit during the time of reception of data. At the end of the transmission of the twenty characters, the remote TDD will also pause. This pause will allow the local station TDD to again resume control of the communication line, and transmit its packet of six characters to the remote terminal. In this way, the two TDDs alternate in the transmission of packets of characters back and forth. In view of the fact that the communication protocol allows the transmission of in excess of eleven characters per second, the communication will still be perceived by the users as fast as or faster than normal Baudot communications, even if both users are occasionally typing at exactly the same time. Also, characters will rarely be lost by simultaneous typing by the two users, since each station is buffering its output and transmitting only when it is not receiving.

The time period for such a pause between character sets can be brief. Clearly, the longer the pause and the more often the pause is inserted between characters, the slower the overall rate of communications will be. The pause may be as short as two average bit times (20 milliseconds) or as long as 100 milliseconds, depending upon needs. In any event, a first portion of the pause period (perhaps 10 milliseconds) is appropriate simply to let the transients on the telephone line to settle and for echoes to cease, following the tones from the transmitting station being transmitted. Thereafter, the transmitting station would sense for data transmission from the previously receiving station. If no data transmission is received, the station can go back and send another set of characters, whereas if data is received from the remote station, transmission would temporarily cease.

If data is both being received and transmitted by the enhanced TDD device, it is helpful that both sets of data be displayed for the user. TDDs can have a single or multiple line display for the user. In order for both transmitting and receiving data to be displayed, the display must be split into two portions. The split can be along a vertical or a horizontal axis. If the display is two lines or larger, one line can be used for transmitting data while another is used for received data. In any event, the presentation of characters to the display is always done under software control, and hence it is a relatively simple matter for the microprocessor to split sections of the memory and separately up date the two sections based on the data received, so that the display continually scrolls the two characters strings, one for the data typed by the user and one for the information being received from the remote station.

It is an advantage of the method of operating TDDs as described herein that it can be implemented and retrofitted to existing TDDs solely by software upgrade. As can be seen in FIG. 1, the hardware portions of the internal components of a conventional TDD are quite capable of handling the needs of the enhanced TDD protocol described herein. The hardware portions of the circuits of FIG. 1 have little to do with the actual timing of the data input and output. The timing details of the transmission of data and the translation and recognition of the codes of the data, are all handled under software control by the program for the microprocessor contained in the ROM 22. In fact, even conventional TDDs often include 7-bit character table in their memory, in order to recognize characters from ASCII keyboards and present characters to ASCII displays or printers. Hence, no new additional data tables even need to be added to the program in many TDDs to gain the abilities of the enhanced TDD protocol. What does need to be altered in the program is simply the timing and flow of transmitted data, as well as constraining the transmission of data to obey the rules for pseudo-duplex communication described above. In addition, the program must efficiently and tolerantly test for the presence of the synchronization characters at all times, even in the middle of communicating in conventional 45.5 Baud communication. This is so that if the synchronization character is received, the enhanced TDD device can respond appropriately, so that further communication can be conducted in the enhanced TDD protocol.

It is understood that the enhanced TDD protocol described here may also be implemented in other TDD-compatible devices intended to communicate with the TDD network of users. Such devices include bulletin boards, news-services and other automated TDD communication devices with other than human (i.e. keyboard) inputs.

Automatic Identification as a TDD

The enhanced protocol of the present invention has built into it a function so that the TDD terminal is automatically self-identifying as a TDD device. This self-identification procedure and capability is particularly useful for communication with emergency services, but is also generally useful and functional in everyday communication. The manner of self-identification by the TDD of the present invention is particularly intended to be both distinctive and unlikely to lead to erroneous signals.

In its operation, the TDD of the present invention will, unlike conventional TDD, initiate communication transmission on its own. This will be described in more detail below with respect to emergency and machine-to-machine communication. The sequence would work as follows: The TDD makes a call to a remote facility. Once the communication link is established, first there is a pause or delay which is specifically intended to be enough time so that the user can see call progress on the signal light on his own TDD. The time necessary is somewhat variable, but a delay of seven seconds has been found to be suitable. The TDD is receptive, during this first delay period, to received data transmissions and, if data is received, the auto-identifying signal may not be sent. After this delay, the TDD transmits a message of two or more characteristic and specially timed characters. The message is also transmitted in a unique fashion. After each character is transmitted, the machine pauses for another delay time period. The delay time can be variable, anywhere from one to two bit times to one to two character times, a time period of approximately 176–352 milliseconds. Thus the machine sends a first character, pauses, sends a second character, pauses, and sends a third character. The total lapsed time of that sequence is preferably the equivalent of 5 character times or less under standard Baudot protocols. During the pauses between transmission of the individual characters, the TDD examines the incoming telephone signal line to ascertain whether a response, in the form of data reception from a remote terminal, has been received. The pauses are necessary in order to sense incoming data characters from the remote terminal, since standard TDD communication is simplex permitting only one station at a time to transmit if data is to be understood. If a response is received during one of the delays, the TDD ceases transmitting the self-identification code and commences normal communication between the two users. A time period for the pause of anywhere from one or two bit times to a character time (5–350 milliseconds) are sufficient to test for such a responsive transmission. The pauses must be less than three seconds for the signal to trip the TDD detectors.

It is advantageous that the self-identifying code be more than one character. Single character codes are too prone to false tripping of detection equipment. Consequently many existing TDD detectors may require more than one character to trip. Since the TDD tones (1400 and 1800 Hertz) are well within the range of normal audible sounds in the environment, it is advantageous that the detecting, devices located at emergency service facilities, or other facilities which interact with TDD equipped users, have features designed so as to minimize the connection time of TDD calls to hearing operators. Thus it is intended and desired that the TDD self-identification code be very distinctive and not one likely to be replicated in the background environment of any hearing person's call.

It has been found herein that three characters transmitted in the pattern described above satisfy the criterion. In particular, it has been found desirable that the three characters specifically identify the text device. This can be done most conveniently by typing the class of the device. In North America, what would be typed is for example "TDD," or "TT ." In other words, the first character would be a "T" and the second and third characters during the self-identification sequence would be a "D." In this way, once switching has been made at the receiving station to the appropriate TDD-equipped operator, what would happen is that the operator would see on his or her TDD a confirmation that a TDD is seeking to communicate. The character sequence can be varied to other indications, such as "TT_" (T,T, space character) for "text-telephone" or other codes or acronyms.

In one embodiment, four space characters may be used separated by short pauses so as to occur within the requisite three seconds. Use of the space characters eliminates the display of possibly confusing characters on the receiving TDD (the space characters simply move the cursor or carriage of the printer). Further, some TTD printers are configured to ignore sequential space characters so as to conserve paper. Such printers would, for all practical purposes, ignore the multiple space character.

It has also been found that the three character, format described here, i.e. character one, pause, character two, pause, character three, long pause, repeat, is particularly effective and efficient. It has been found that devices which detect TDDs (TDD detectors) vary in what threshold is determined to represent TDD communications. Some TDD detectors require two characters within four seconds, while others require three characters within seven seconds. The TDD self-identification protocol described here triggers all known TDD detectors and provides a visual self-identification to a receiving TDD if on-line.

When normal communication is established between the calling TDD and the called TDD, the self-identification signal is ceased. A timing circuit continually and periodically tests whether either transmitting or receiving transmissions are occurring. If the TDD is neither sending nor receiving data for more than a pre-determined period of time, the TDD again commences the auto-identification sequence. A suitable period of time for the TDD to wait prior to initiating self-identification again is imposed. This time period is typically more than six seconds. The function of this resume TDD self-identification sequence is to remind the other terminal that the TDD is present on the line and awaiting communications. This periodically repeated signal is also useful to identify a TDD call if telephone lines are switched or put on hold. Since the TDD is periodically identifying itself, a hearing person picking up the telephone line connected to the TDD would hear a characteristic tone sequence and know that TDD communication is appropriate.

Thus, the TDD of the present invention is intended to identify itself automatically, without user input or action. Since the automatic self-identification happens inherently at the commencement of each communication session, once these devices are widespread, receiving devices can begin to test for and detect the automatic identification signal to identify automatically the identity and/or type of the calling station and display the information for the user. This automatic identification also facilitates calls to telephone lines handled by hearing users (e.g. "911" centers) who will promptly be notified that a TDD is on the line due to the tones received.

Machine Control Commands

The enhanced TDD protocol described above makes use of the larger 7-bit character set. Unlike the smaller 64-character Baudot character set, the seven-bit ASCII and CCITT character sets of 128 characters includes both upper and lower case letters and, in addition, includes a full set of punctuation and the ability to include control characters. This permits the TDD to operate with control codes not presently available in conventional Baudot communication. Such control codes may be used to facilitate machine-to-machine communication along the same telephone lines used for communication between the TDD operators but in a manner invisible to the operators of the TDD terminals.

Of particular interest are machine-to-machine commands for controlling a voice bridge in a TDD relay. A TDD relay is used when it is necessary or desirable for a TDD user to call a telephone number that is not equipped with a TDD. These calls may be either emergency or non-emergency, e,g, telephone calls to police, employers, doctors, repair and maintenance workers, relative and loved ones, etc. In order to make possible telephone calls between a TDD user and a non TDD equipped telephone number, TDD relay centers have been established in many locations, A TDD relay center receives telephone calls, via TDD, from TDD users who require a relay operator to place a call with a second party for them. The relay operator then calls the second party and tells the second party what the TDD caller is typing. When the second party talks, the operator then types back to the TDD caller. Conversely, a call through the relay center may originate from a non-TDD user wishing to communicate with a TDD user. The call then proceeds in the same manner.

U.S. Pat. No. 5,081,673, entitled: Voice Bridge for Relay Center, issued Jan. 14, 1992 to Engelke, et al, assigned to the assignee of to present invention and hereby incorporate by reference, describes such a relay where the TDD user may instruct the relay operator to intercept only half the conversation for translation and to allow direct voice communication of the other half of the conversation in the other direction. This may be desirable when the originating party to the conversation, although hearing impaired, has the ability to speak directly to the other party or in cases where the originating party to the conversation is incapable of speech but otherwise a fully hearing individual. The portion of the conversation not intercepted by the relay operator but passing directly between telephone handsets is carried on a "voice bridge" and the simultaneous transmission of these voice signals along with TTD signals is termed "voice carry over" ("VCO").

Voice carryover increases the speed of the conversation and improves its privacy and may be selected by either party to the conversation through instructions to the relay operator or directly by means of a string of characters typed into the TDD user's terminal. For example, the character string "/bridge out" may be used to disconnect the voice carryover bridge. Such a string should be one that is not likely to be used in normal conversation and ideally one that may be recognized from its early characters so that the string is not printed by a TTD machine. These requirements are, generally, at odds with each other.

The present invention through the use the a special synchronization sequence similar to the O-SYNCH and A-SYNCH sequences described above, termed the [REQ] (request) sequence, eliminates this need to select a lengthy character set for this machine-to-machine communication.

In particular, a machine-to-machine message, intended to be invisible to the TDD users, follows the following format

[REQ][CATEGORY][FUNCTION][ERQ]

In this command, [REQ] is a synchronization signal similar to that described above with respect to FIG. 3 serving to indicate a machine command, yet to be nonprintable both to machines operating under the enhanced Baudot protocol and conventional Baudot machines.

Figure 5:
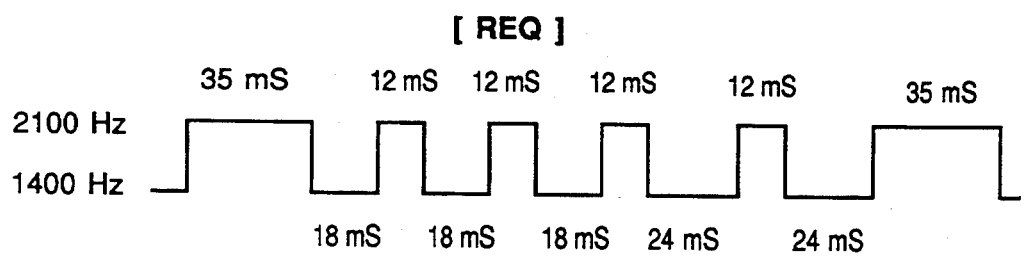
FIG. 5 illustrates a timing diagram of a character indicating a machine communication.

Shown in FIG. 5 is a timing diagram of the character used for the [REQ] sequence. The [REQ] sequence begins with an echo suppression pulse "EST" as described before but for 35 milliseconds to unlock the receiving phase locked loops. This is followed by three 18 milliseconds mark tones and two 24 milliseconds mark tones, each separated by twelve milliseconds echo suppression tones. The pattern is terminated with a 35 millisecond echo suppression pulse. The [REQ] sequence thus is distinguishable from the A-SYNCH sequence by the length of the final two mark tones.

The [REQ] sequence is not an ASCII character, both because it does not conform to the format of an ASCII character with start and stop bits flanking a sequence of marks and spaces, and because it is not one of the character codes obtainable with the ASCII word length. It follows, generally, that the [REQ] sequence may not be initiated by the TDD user by pressing the keys on the keyboard. For this reason, as will be discussed further below, the [REQ] sequence is particularly well suited for applications, such as initiating the "downloading" of emergency information by an emergency service, which should be reserved to particular users, such as legitimate emergency services, and which should be generally prohibited from other users, such as residential users.

The [REQ] sequence is followed by a [CATEGORY] character which is a 7 bit binary number limited to 16 numbers from hexadecimal 10H (16) to 1FH (31). These are nonprinting characters under the ASCII character set and thus provide a degree of error correction without risk of printing on the TDD. If the character following the [REQ] sequence is not within the 10H to 1FH range then the machine-to-machine communication procedure is aborted before it causes a response or changing operation of the TDD.

In the preferred embodiment, [CATEGORY] 10H is reserved for general machine-to-machine communication between TDDs, whereas [CATEGORY] 11H is used for automatic machine-to-machine communication for emergency services. [CATEGORY] 12H is used for machine-to-machine communication for TDD relay functions.

The next character of the machine-to-machine message format is a [FUNCTION] character which may be any 7 bit number. The value of the [FUNCTION] character is interpreted in light of the [CATEGORY] character previously transmitted. If the [CATEGORY] character is 11H (emergency services), then a [FUNCTION] of 01H instructs the originating TDD to transmit caller information in a block format as will be described below. The pseudo-duplex capabilities of the enhanced TDD protocol eliminates the possibility that this block of information will be inadvertently interrupted and garbled by transmissions by either party. If the [CATEGORY] value is 12H (relay services), [FUNCTIONS] 01H to 06H may be obtained as provided in Table I.

TABLE I

| | |
|---|---|
| 01H | Number to dial |
| 02H | Carrier of choice |
| 03H | Relay user ID |
| 04H | VCO on |
| 05H | VCO off |

"Number to dial" is the number of the other party of the conversation,which in this manner may be received and dialed automatically by the relay without operator intervention to eliminate the possibility of error in dialing, to speed the dialing process, and to enhance the privacy of the communication.

"Carrier of choice" indicated by [FUNCTION] 02H, is simply a selection of a long distance carrier desired by the caller.

[FUNCTION] 03H, the relay user ID is a personal identification number that may be requested of the originating caller to check for authorization of a particular user to use that relay whereas [FUNCTION] 05H and [FUNCTION] 06H: "VCO On" and "VCO Off" control a voice bridge as described above.

The final portion of the machine-to-machine message format is an [ERQ] (end of request) character which is a standard ASCII character 04H. The termination of the machine command by the [ERQ] character is used to allow the TDD software to respond to machine-to-machine requests at variable lengths. For example, the response to a request for emergency service caller information could be any length from zero (no data) to tens of characters. The initiating TDD would collect the characters until an [ERQ] character was received. The format for a response to a machine-to-machine request is simply

[REQ] [RESPONSE] [ERQ]

where [RESPONSE] is the responding data.

Referring now to FIG. 1, the transmission of the "VCO on" message, described above, may be initiated by the lifting of the handset 23 from the cradle 21 indicating that the caller intends to use the voice portion of the telephone line either to listen or to speak. Upon lifting the handset 23, the initiating TDD can automatically send a "VCO on" command to the voice bridge which automatically removes the relay operator from that portion of the conversation. Analogously, when the handset 23 is replaced on the cradle 21, indicating that the voice portion of the telephone line is not to be utilized, the originating TDD may send the "VCO off" command automatically instructing the relay operator's machine to deactivate the voice bridge. These commands, employing the enhanced protocol, are invisible to the TDD users. As will be understood, an additional command can configure the direction of the voice bridge if required.

Emergency Caller Identification

When a TDD operator calls an emergency service such as the 911 service available in many communities, if the emergency service TDD determines that the caller's TDD employs the enhanced protocol (through the procedures described above) the emergency service TDD may transmit a [REQ] [11H] [01H] [ERQ] message that will not be displayed by the caller's TDD but will instruct the caller's TDD to relay caller identification information stored in the memory 24. This caller identification information, which may include the caller's name, address, telephone number and other critical emergency information, may have been previously entered by the caller under non-emergency circumstances via keyboard 12.

The caller identification information is rapidly transmitted in the enhanced Baudot protocol without interruption and without intervention by the user.

Note that, unlike ASCII communication protocols, the tone signals utilized within the enhanced TDD protocol of the present invention are conventional Baudot. The tones are also presented on the telephone line only when characters are being transmitted. No carrier tones are maintained when neither station is transmitting. This is a very desirable feature of any TDD communication protocol. Just as hearing and speaking telephone users are occasionally put on "hold," so TDD users are sometimes put on hold. Placing one station of a communication link operating under ASCII protocols (i.e. Bell 212A or the like) on hold terminates the communication link, by breaking the carrier. This is not true either in standard Baudot or enhanced TDD protocol described herein. Since the ability to put someone on hold is a useful part of conventional telephone communications, the fact that a hold capability is inherent in this enhanced TDD protocol is significant.

It is to be anticipated the present invention is subject to much modification and variation but it is understood that the present invention embraces all such forms thereof as come within the scope of the following claims.

We claim:

1. A telecommunication device for the deaf for communication over an analog telephone line, the device comprising:
   a display;
   a keyboard;
   a microprocessor connected to accept input data characters from the keyboard and to present output data characters to the display;
   an analog input circuit adapted to being connected to the telephone line to decode serial Baudot tones as an input to the microprocessor;
   an analog output line connected to receive output from the microprocessor and adapted to being connected to the telephone line to encode the output as serial Baudot tones for transmission over the telephone line; and
   a memory device connected to the microprocessor containing program code for operation of the microprocessor to control operation of the telecommunication device to generally:
   (i) receive input data characters entered from the keyboard,
   (ii) present input data characters from the keyboard as output on the analog output line,
   (iii) receive input from the analog input circuit;
   (iv) decode the input as character data if the input is a serial sequence of two Baudot tones,
   (v) decode the input as command sequences if the input is a serial sequence including only one Baudot tone, and the program further comprising code to display character data on the display unless it is preceded by a first predetermined command sequence.

2. A telecommunication device for the deaf as claimed in claim 1 wherein the program code further displays character data on the display unless it is preceded by a first predetermined command sequence and succeeded by a second predetermined command sequence.

3. A method of operating a telecommunication device for the deaf for communicating with a remote device and including a keyboard, a display, a microprocessor connected to receive data from the keyboard and present data to the display, input and output analog circuits to connect the microprocessor to a telephone line, and a memory circuit, comprising the steps of:
  (i) receiving input from the analog input circuit;
  (ii) decoding the input as character data if the input is a serial sequence of two Baudot tones,
  (iii) decoding the input as a command sequence if the input is a serial sequence including only one Baudot tone, and
  (iv) displaying the character data on the display unless the character data is preceded by a first predetermined command sequence.

4. A telecommunication device for the deaf for communication over an analog telephone line, the device comprising:
  a display;
  a keyboard;
  a microprocessor connected to accept input data characters from the keyboard and to present output data characters to the display;
  an analog input circuit adapted to being connected to the telephone line so as to be responsive to the reception of Baudot tones over the telephone line and also connected to the microprocessor to present the Baudot tones as an input to the microprocessor;
  an analog output line connected to receive digital output from the microprocessor and adapted to being connected to the telephone line so as to transmit Baudot tones encoding the input data over the telephone line; and
  a memory device connected to the microprocessor containing: a sequence of user entered characters providing identification information to emergency personnel and a program code for operation of the microprocessor to control operation of the telecommunication device to generally:
    (i) receive input data characters entered from the keyboard,
    (ii) present input data characters from the keyboard as output to the analog output line,
    (iii) receive input from the analog input circuit;
    (iv) enable communication under either a conventional Baudot protocol or an enhanced TDD protocol which operates at a higher data transmission rate,
    (v) cause a first special synchronization sequence to be transmitted under an enhanced TDD protocol, which sequence is selected to be a sequence which is not recognized as a displayed character by a remote telecommunication device operating under conventional Baudot protocol, and
    (vi) cause the timing and format of communications to be in enhanced TDD protocol; and the program code further causing the telecommunication device to automatically transmit the identification information from the memory via the analog output after communication under the enhanced TDD protocol has been enabled.

5. A telecommunication device for the deaf as claimed in claim 4 wherein the program causes the telecommunication device to automatically transmit the identification information from the memory via the analog output after communication under the enhanced TDD protocol has been enabled and after a transmit identification information command has been received.

6. A telecommunication device for the deaf as claimed in claim 4 wherein the transmit identification information command is preceded by a second special synchronization sequence.

7. A telecommunication device for the deaf as claimed in claim 4 wherein the enhanced TDD protocol includes mark bits and space bits of differing bit time intervals.

8. A telecommunication device for the deaf as claimed in claim 4 wherein the enhanced TDD protocol includes a seven-bit character and the character table from ASCII code.

9. A telecommunication device for the deaf as claimed in claim 4 wherein the enhanced TDD protocol synchronization sequence is a sequence of alternating mark tones which are 1400 Hertz and echo suppression tones which are neither 1800 nor 1400 Hertz echo suppression.

10. A method of operating a telecommunications device for the deaf for communicating with a remote telecommunication device and including a keyboard, a display, a microprocessor connected to receive data from the keyboard and present data to the display, input and output analog circuits to connect the microprocessor to a telephone line, and a memory circuit, comprising the steps of:
  (i) receiving input data characters entered from the keyboard,
  (ii) presenting input data characters from the keyboard as output to the analog output line,
  (iii) receiving input from the analog input circuit;
  (iv) enabling communication under either a conventional Baudot protocol or an enhanced TDD protocol which operates at a higher data transmission rate,
  (v) causing a special synchronization sequence to be transmitted under an enhanced TDD protocol, which sequence is selected to be a sequence which is not recognized as a displayed character by the remote telecommunication device operating under conventional Baudot protocol,
  (vi) causing the timing and format of communications to be in enhanced TDD protocol; and
  (vii) causing the telecommunication device to automatically transmit the identification information from the memory via the analog output after communication under the enhanced TDD protocol has been enabled.

11. A telecommunication device for the deaf as claimed in claim 10 wherein the special synchronization sequence to be transmitted under the enhanced TDD protocol comprises a sequence of echo suppression tones, being neither of the Baudot tones of substantially 1400 Hz nor 1800 Hz, and mark tones of substantially 1400 Hz, beginning with an echo suppression tone and alternating between echo suppression tones and mark tones until five mark tones have been transmitted.

12. A telecommunication device for the deaf TDD for communication over an analog telephone line, the device comprising:
   a telephone handset switch;
   a keyboard;
   a microprocessor connected to accept input data characters from the keyboard and a handset state signal from the telephone handset switch indicating whether a telephone handset is in use, and to present output data characters to the display;
   an analog input circuit adapted to being connected to the telephone line so as to be responsive to the reception of Baudot tones over the telephone line and also connected to the microprocessor to present the Baudot tones as an input to the microprocessor;
   an analog output line connected to receive data from the microprocessor and adapted to being connected to the telephone line so as to transmit Baudot tones encoding the input data over the telephone line as a output; and
   a memory device connected to the microprocessor containing the program code for operation of the microprocessor to control operation of the telecommunication device to generally:
      (i) receive input data characters entered from the keyboard,
      (ii) present input data characters from the keyboard as output to the analog output line,
      (iii) receive input from the analog input line;
      (iv) enable communication under either a conventional Baudot protocol or an enhanced TDD protocol which operates at a higher data transmission rate,
      (v) cause a special synchronization sequence to be transmitted under an enhanced TDD protocol, which sequence is selected to be a sequence which is not recognized as a displayed character by a remote telecommunication device operating under conventional Baudot protocol, and
      (vi) cause the timing and format of communications to be in enhanced TDD protocol;
   after the enhanced TDD protocol is enabled, the program code further causing the telecommunication device to automatically transmit a voice carry over sequence in the enhanced TDD protocol from the analog output, such sequence of selected to activate the voice carry-over features of a connected TDD relay when the handset state signal from the handset switch indicates that the handset is in use.

13. A telecommunication device for the deaf as claimed in claim 12 wherein the voice carry over sequence is preceded by a special synchronization sequence to be transmitted under an enhanced TDD protocol, which sequence is selected to be a sequence which is not recognized as a displayed character by a remote telecommunications device operating under conventional Baudot protocol.

14. A telecommunication device for the deaf as claimed in claim 12 wherein the voice carry over sequence is preceded and terminated by a special synchronization sequence to be transmitted under an enhanced TDD protocol, the sequences being selected to be sequences which are not recognized as a displayed character by a remote telecommunications device operating under conventional Baudot protocol.

15. A method of operating a telecommunication device for the deaf TDD for communicating with a remote device and including a keyboard, a display, a microprocessor connected to receive data from the keyboard and present data to the display, input and output analog circuits to connect the microprocessor to a telephone line, and a memory circuit, comprising the steps of:
   (i) receiving input data characters entered from the keyboard,
   (ii) presenting input data characters from the keyboard as output the analog output line,
   (iii) receiving input from the analog input line; and,
   (iv) enabling communication under either a conventional Baudot protocol or an enhanced TDD protocol which operates at a higher data transmission rate,
   (v) causing a special synchronization sequence to be transmitted under the enhanced TDD protocol, which sequence is selected to be a sequence which is not recognized as a displayed character by a remote telecommunication device operating under conventional Baudot protocol, and
   (vi) causing the timing and format of communications to be in enhanced TDD protocol; and
   (vii) after the enhanced TDD protocol is enabled, causing the telecommunication device to automatically transmit a voice carry over sequence in the enhanced TDD protocol from the analog output, such sequence of selected to activate the voice carry-over features of a connected TDD relay when the handset switch indicates that a telephone handset is in use.

* * * * *